P. A. L. & E. FOULDS.
COLOR CHANGING ATTACHMENT FOR LIGHT PROJECTORS.
APPLICATION FILED SEPT. 30, 1915.
1,170,621.
Patented Feb. 8, 1916.
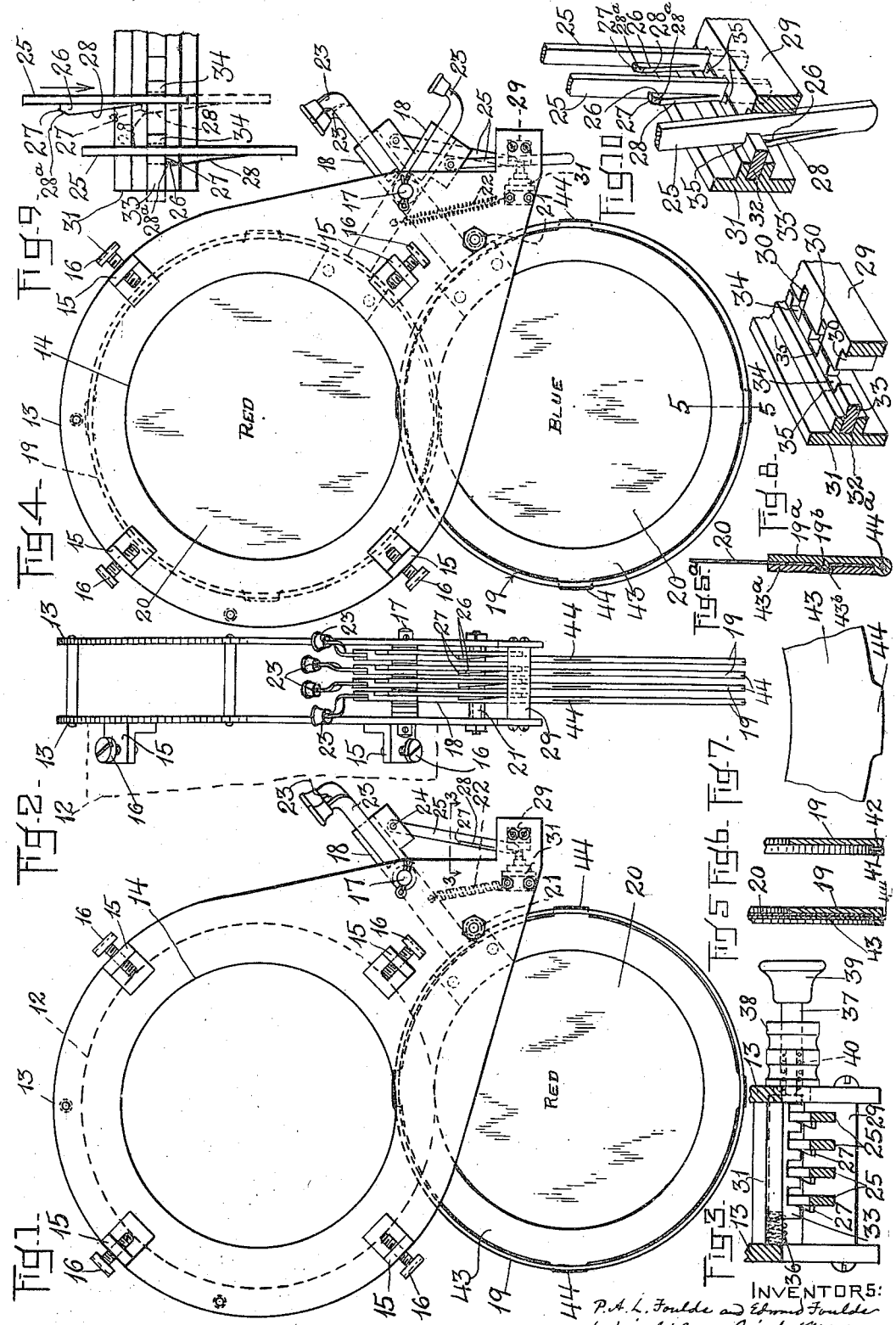
INVENTORS:
P. A. L. Foulds and Edmond Foulds
by Wright Brown Quinby May
ATTY'S.

UNITED STATES PATENT OFFICE.

POWYS A. L. FOULDS AND EDWARD FOULDS, OF BOSTON, MASSACHUSETTS.

COLOR-CHANGING ATTACHMENT FOR LIGHT-PROJECTORS.

1,170,621.   Specification of Letters Patent.   Patented Feb. 8, 1916.

Application filed September 30, 1915. Serial No. 53,327.

*To all whom it may concern:*

Be it known that we, POWYS A. L. FOULDS and EDWARD FOULDS, subjects of the King of Great Britain, and residents of Dorchester, Boston, in the county of Suffolk and State of Massachusetts, have invented certain new and useful Improvements in Color-Changing Attachments for Light-Projectors, of which the following is a specification.

This invention relates to light projectors such as so-called spot-light machines, stereopticons, etc., the projector being adapted to project a beam of light on to a theater stage, a screen, or other surface.

The invention has for its object to provide improved means for controlling and changing the color of the projected light and causing the light to pass through any desired number of light transmitting color frames which are stored in a compact space beside the lens of the projector and are adapted to be quickly and conveniently projected into and moved from the path of the beam of light.

The invention consists in the improvements which we will now proceed to describe and claim.

Of the accompanying drawings forming a part of this specification: Figure 1 represents a side elevation of a color changing attachment embodying the invention; Fig. 2 represents an edge view of the same; Fig. 3 represents a section on line 3—3 of Fig. 1, and a plan view of the parts below said line; Fig. 4 represents a view similar to Fig. 1, showing one of the color frames projected to its operative position; Fig. 5 represents an enlarged section on line 5—5 of Fig. 4; Fig. 5ª represents a view similar to Fig. 5, on a larger scale, showing a differently constructed color frame; Fig. 6 represents in section one of the members shown by Fig. 5; Fig. 7 is a fragmentary side view showing a portion of another member shown by Fig. 5; Fig. 8 is a fragmentary perspective view, showing portions of the fixed guiding cross pieces and the keeper hereinafter referred to; Fig. 9 represents a side elevation showing a portion of one of the fixed cross pieces and a portion of the keeper, the other fixed cross piece being removed and two of the latch bars hereinafter referred to being represented; Fig. 10 represents a view similar to Fig. 8, showing three of the latch bars in connection with the guiding cross pieces and the keeper.

The same reference characters indicate the same or similar parts in all the views.

The improved attachment comprises a frame adapted to be secured to one end of the casing 12 of a light projector, said casing being indicated by dotted lines in Figs. 1 and 2. As here shown the frame is composed of two spaced-apart members 13 rigidly connected by any suitable means, each having an aperture 14 for the passage of light through the frame. The inner frame member is provided with suitable means for attaching the frame to the casing 12, said means as here shown including the brackets 15 and set screws 16 engaged therewith. Fulcrumed on a transverse stud 17 engaged with the frame members are a series of levers 18, each having attached to one of its ends a color frame 19 preferably of annular form and provided with a light transmitting filler 20, which may be a sheet of colored glass, gelatin, or other suitable material.

Four color frames 19 are here shown, but it is obvious that the number of frames may be greater or less, each frame being provided with a filler the color of which differs from that of the fillers of the other frames.

The levers and color frames are normally held in a retracted inoperative position out of register with the frame apertures 14, as shown by Fig. 1, the levers and frames when in this position being supported by a stop 21 extending between the frame members and preferably faced with rubber or other yielding material, the arrangement being such that the frames and levers are adapted to gravitate to their retracted position, the movement of the frame and levers to such position being accelerated if desired by springs 22. Each lever is provided at its outer end with a finger key 23 whereby it may be manually moved to raise or project the inner portion of the lever and its color frame to a position between the light apertures, as shown at the upper portion of Fig. 4.

Mechanism is provided for locking the levers in their projected position, said mechanism having means operated by the movement of any lever to its projected position to automatically unlock any other lever or levers previously projected and permit the same to return to a retracted position, the nature of said mechanism being such that one, two, or all of the color frames may be simultaneously locked in a projected position. The attachment is provided with manually operated means for releasing any projected lever or levers and permitting the same to return to a retracted position. In the preferred embodiment of the invention here shown, the said locking mechanism is organized as follows: To each lever 18 is pivoted at 24 an oscillatory latch bar 25, one side of which is provided with a laterally projecting ear or lug 26 constituting a detent and having an end face 27 and an inclined side face 28. 29 represents a fixed cross piece extending across the space between the frame members and provided with transverse or vertical slots 30 formed to guide the detents 26 in predetermined paths relatively to the shoulders of the keeper hereinafter described. 31 represents another fixed cross piece spaced from the cross piece 29 and provided with a longitudinal slot 32 in which a keeper 33 is longitudinally movable. Said keeper is provided with recesses 34, which are wider than the slots 30 in the cross bar 29. One end of each recess constitutes a shoulder 35 which is yieldingly held by a spring 36 (Fig. 3) in the path of one of the detents 26. When the levers and color frames are retracted the detents 26 are held above the keeper 33, as indicated by the right-hand portion of Fig. 10. When a key 23 is depressed the latch bar 25 of the corresponding lever is forced downwardly and the inclined face 28 of its detent is caused to displace the keeper 33 against the force of the spring 36 until the detent passes below the keeper, whereupon the spring 36 forces a shoulder 35 of the keeper into engagement with the detent face 27, as indicated at the left of Fig. 10, the raised or projected color frame being thus locked in its projected position. When another key 23 is depressed the detent on the latch bar of the corresponding lever in displacing the keeper 33 as above described releases the latch bar of the previously projected lever and color frame and permits the latter to drop to its retracted position just before the last depressed latch bar is locked. This operation is illustrated by Fig. 9, which shows a raised latch bar 25 in full lines, and the same latch bar by dotted lines as depressed far enough to cause the release of the other latch bar shown by this figure.

It will now be seen that one or any number of color frames may be projected and locked, provision being made for locking all the color frames at one time in a projected position. It will also be seen that when one or more of the color frames has or have been projected the projection of another color frame releases the projected frame or frames and permits the same to return to retracted position.

In case all the color frames have been projected and locked they may be simultaneously unlocked and permitted to return to their retracted position by means of a manually operated push-piece 37, which is movable in a fixed guide 38 attached to one of the frame members 13 and bears on one end of the keeper 33. An inward pressure on the push-piece 37, which is provided with a suitable knob or key 39, displaces the keeper against the pressure of the spring 36 and releases any latch bars locked thereby. The push-piece 37 is normally retracted from contact with the keeper 33 by a spring 40 (Fig. 3).

Each color frame includes a body member 19 attached to the corresponding lever 18 and provided at one side with a laterally projecting flange 41 in which slots 42 are formed at suitable intervals. The filler 20 bears on the body member 19 and flange 41, as indicated by Fig. 5, and is confined in position by a detachable frame-shaped member 43, which is preferably a thin sheet metal ring and is provided with ears 44 formed to enter the slots 42. In assembling the parts of the color frame the ears 44 are sprung into the slots 42, the frame member 43 being thus confined against one side of the filler 20. Provision is thus made for removing a broken filler and substituting a new one in its place.

The inclined face 28 of each ear or lug 26 is preferably beveled or given a slight opposite inclination at 28$^a$ (Figs. 9 and 10) to reduce the width of the end face 27 and insure the quick release of the corresponding latch bar 25.

Fig. 5$^a$ shows a color frame body member 19$^a$ having studs 19$^b$ (only one stud being shown) arranged to enter orifices 43$^b$ in a movable frame-shaped member 43$^a$, which may be permanently connected by a hinge 44$^a$ with the member 19$^a$, and detachably connected elsewhere therewith by suitable catches (not shown). The marginal portion of the colored filler 20 is placed against one side of the body member 19$^a$ and the member 43$^a$ is then pressed against it and confined in the position shown, the studs 19$^b$ being thus caused to indent the marginal portion of the filler.

Having described our invention, we claim:

1. A color changing device comprising a supporting frame, a series of oscillatory levers fulcrumed thereon, color frames carried by said levers, each lever and its color frame being normally held in a retracted inoperative position, and being manually movable with its frame to a projected operative position, and mechanism for locking the levers in their projected position, said mechanism having means operated by the movement of any lever to its projected position to automatically unlock any other lever or levers previously projected and permit the same to return to a retracted position.

2. A color changing device comprising a supporting frame, a series of oscillatory levers fulcrumed thereon, color frames carried by said levers, each lever and its color frame being normally held in a retracted inoperative position, and being manually movable with its frame to a projected operative position, and mechanism for locking the levers in their projected positions, said mechanism having manually operated means for releasing any projected lever or levers and permitting the same to return to a retracted position.

3. A color changing device comprising a supporting frame, a series of oscillatory levers fulcrumed thereon, color frames carried by said levers, each lever and its color frame being normally held in a retracted inoperative position, and being manually movable with its frame to a projected operative position, oscillatory latch bars pivoted to said levers and provided with detents having inclined faces, said bars being movable longitudinally by the levers, a fixed guide maintaining the latch bar detents in predetermined paths, and a spring-pressed keeper having a plurality of shoulders normally held yieldingly in the paths of said detents, the keeper being displaceable by a detent on either latch bar to release the latch bar of any previously projected lever or levers.

4. A color changing device comprising a supporting frame, a series of oscillatory levers fulcrumed thereon, color frames carried by said levers, each lever and its color frame being normally held in a retracted inoperative position, and being manually movable with its frame to a projected operative position, oscillatory latch bars pivoted to said levers and provided with detents having inclined faces, said bars being movable longitudinally by the levers, a fixed guide maintaining the latch bar detents in predetermined paths, a spring-pressed keeper having a plurality of shoulders normally held yieldingly in the paths of said detents, the keeper being displaceable by a detent on either latch bar to release the latch bar of any previously projected lever or levers, and a manually movable push-piece whereby the keeper may be displaced to release the bar of any projected lever or levers.

5. A color changing device comprising a frame composed of rigidly connected spaced-apart members apertured for the passage of light rays, one of said members having means for attaching the frame to a light projector, a series of levers fulcrumed between the frame members and each having a color frame which is movable by and with the lever to a projected operative position between the apertures of the members, means being provided for normally holding each lever and frame in a retracted inoperative position with the frame out of register with said apertures, and mechanism for locking the levers in their projected positions, said mechanism having means, operated by the movement of any lever to its projected position, to automatically unlock any other lever or levers previously projected.

6. A color changing device comprising a frame composed of rigidly connected spaced-apart members apertured for the passage of light rays, one of said members having means for attaching the frame to a light-projector, a series of levers fulcrumed between the frame members and each having a color frame which is movable by and with the lever to a projected operative position between the apertures of the members, means being provided for normally holding each lever and frame in a retracted inoperative position with the frame out of register with said apertures, and mechanism for locking the levers in their projected positions, said mechanism having means, operated by the movement of any lever to its projected position, to automatically unlock any other lever or levers previously projected, and manually operated means for releasing any projected lever or levers.

7. A color changing device comprising a frame composed of rigidly connected spaced-apart members apertured for the passage of light rays, one of said members having means for attaching the frame to a light projector, a series of levers fulcrumed between the frame members and each having a color frame which is movable by and with the lever to a projected operative position between the apertures of the members, means being provided for normally holding each lever and frame in a retracted inoperative position with the frame out of register with said apertures, oscillatory latch bars pivoted to said levers and provided with detents having inclined faces, said bars being movable longitudinally by the levers, fixed cross pieces extending across the space between the frame members, one of said cross pieces being provided with transverse guiding slots maintaining the latch bar detents in predetermined paths, and the other cross piece being provided with a longitudinal slot, and a spring-pressed keeper movable in said longitudinal slot and having a plurality of shoulders normally held yieldingly in the paths of said detents.

8. A color changing device comprising a frame composed of rigidly connected spaced-apart members apertured for the passage of light rays, one of said members having means for attaching the frame to a light projector, a series of levers fulcrumed between the frame members and each having a color frame which is movable by and with the lever to a projected operative position between the apertures of the members, means being provided for normally holding each lever and frame in a retracted inoperative position with the frame out of register with said apertures, oscillatory latch bars pivoted to said levers and provided with detents having inclined faces, said bars being movable longitudinally by the levers, fixed cross pieces extending across the space between the frame members, one of said cross pieces being provided with transverse guiding slots maintaining the latch bar detents in predetermined paths, and the other cross piece being provided with a longitudinal slot, a spring-pressed keeper movable in said longitudinal slot and having a plurality of shoulders normally held yieldingly in the paths of said detents, a tubular guide on one of the frame members, and a push-piece movable in said guide and adapted to be manually moved to displace said keeper and release the bar of any projected lever or levers.

In testimony whereof we have affixed our signatures.

POWYS A. L. FOULDS.
EDWARD FOULDS.